April 3, 1934.  B. F. SINGER  1,953,871
SAFETY DEVICE
Filed March 21, 1932  2 Sheets-Sheet 1

Inventor
B. F. Singer
By Lacey & Lacey,
Attorneys

April 3, 1934.                B. F. SINGER                1,953,871
                              SAFETY DEVICE
                         Filed March 21, 1932        2 Sheets-Sheet 2
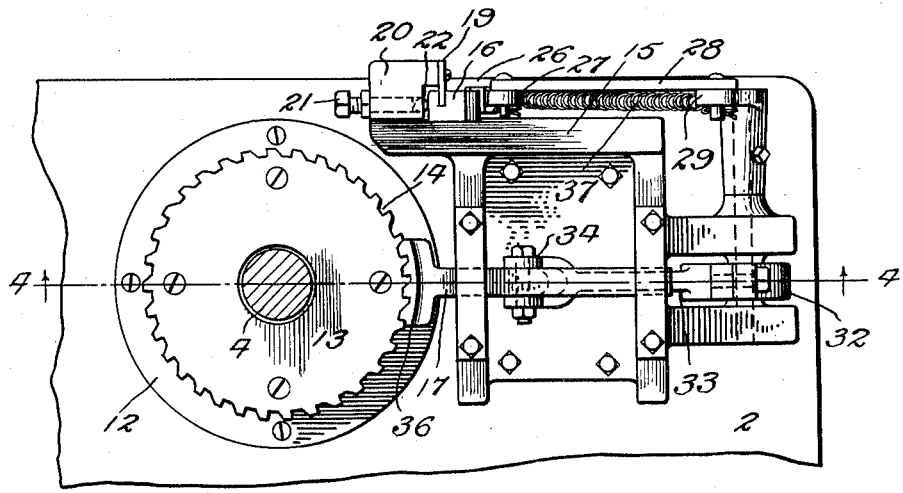
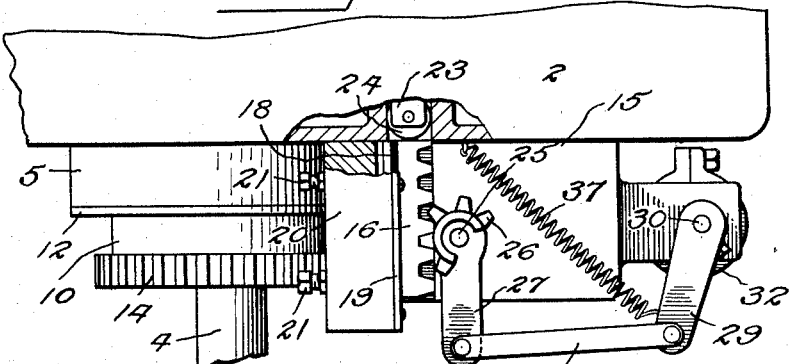
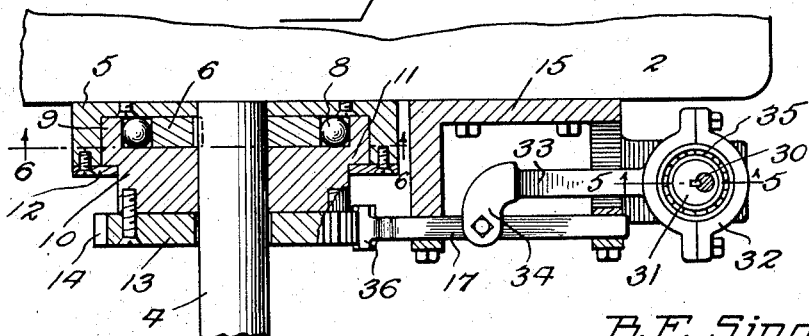

Patented Apr. 3, 1934

1,953,871

UNITED STATES PATENT OFFICE 1,953,871

SAFETY DEVICE

Benjamin F. Singer, Lancaster, Pa., assignor of one-half to Carl B. Isecovitz, Lancaster, Pa.

Application March 21, 1932, Serial No. 600,270

7 Claims. (Cl. 192—4)

In the operation of automobiles it frequently happens that the car is stopped while on a steep upgrade. This is sometimes due to the deliberate action of the chauffuer in stopping the car and often is due to the engine stalling or for various other reasons when it is not desired that the car should stop. Under these conditions, unless some positive means is provided to prevent backward travel of the car, it may, and sometimes does, start to roll down-hill, and it is the object of the present invention to provide means whereby the retrograde movement of the car under such conditions will be positively prevented even if the brake should not be properly applied or, if applied, should fail to hold. Another object of the invention is to provide a mechanism for the stated purpose which will be rendered inoperative when the transmission gearing is shifted into reverse and it is desired to drive the car backward. These stated objects, and other objects which will appear incidentally in the course of the following description, are attained in such an apparatus as is illustrated in the accompanying drawings, and the invention resides in certain novel features which will be particularly pointed out in the appended claims.

Figure 1:
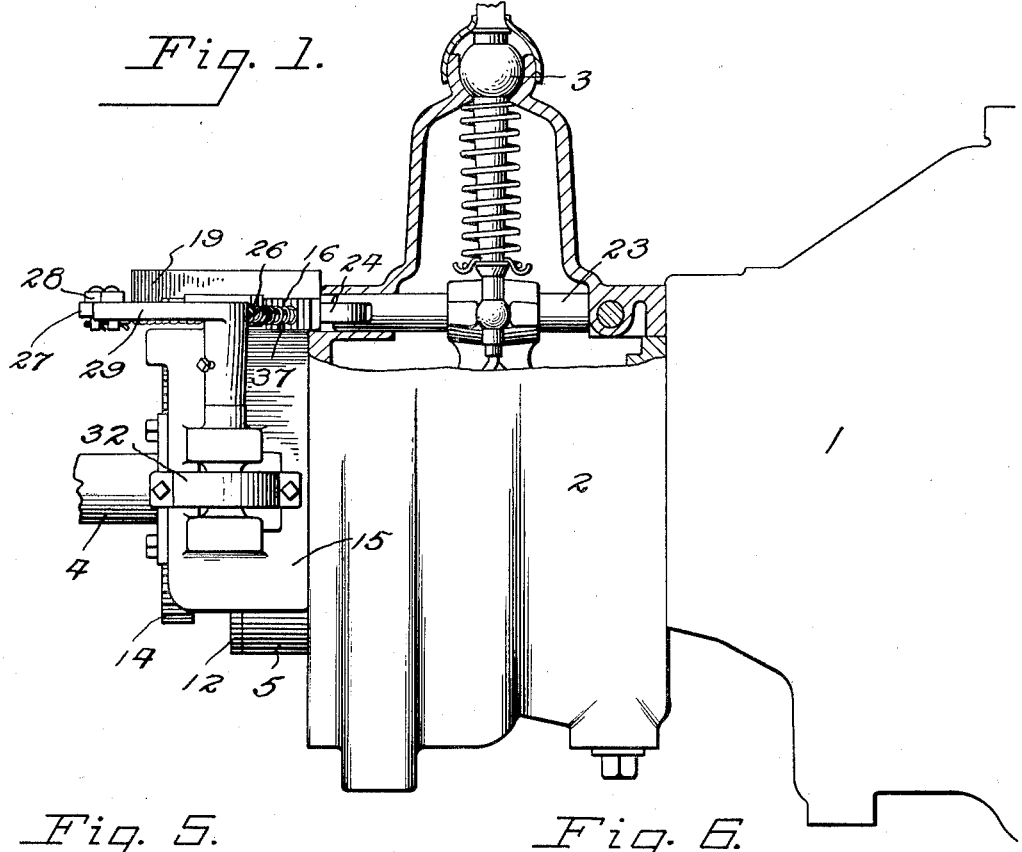

In the drawings, Figure 1 is a side elevation of so much of the transmission housing of an automobile as is needed for an understanding of the present invention.

Figures 5, 6:
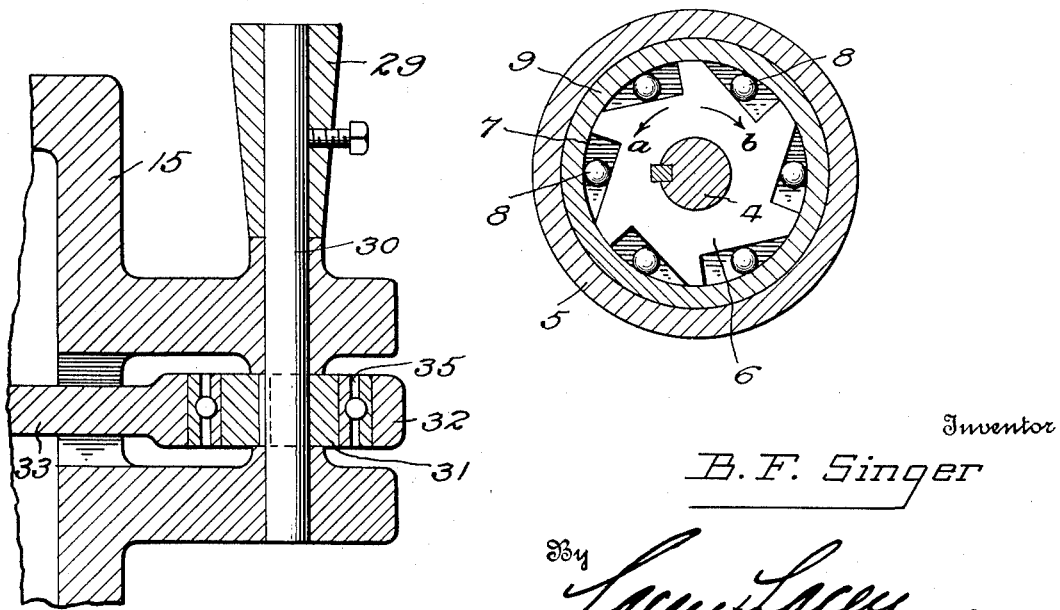

Fig. 2 is a rear elevation of the same with a part in section,

Fig. 3 is a top plan view of the devices constituting the present invention with a part in section, Fig. 4 is a horizontal section on the line 4—4 of Fig. 2, Fig. 5 is an enlarged detail section on the line 5—5 of Fig. 4, Fig. 6 is a section on the line 6—6 of Fig. 4.

Referring to the drawings, the reference numeral 1 indicates a portion of the engine block and the numeral 2 indicates the transmission housing while the numeral 3 indicates the usual gear shift lever which cooperates with the transmission gearing to place the elements of said gearing in the proper speed relation or to drive the car either forwardly or backwardly. The numeral 4 indicates a portion of the propeller shaft.

In carrying out the present invention, there is secured to the rear end of the transmission housing a ring or circular casing 5 which is disposed concentrically about the propeller shaft 4, as will be understood upon reference to Fig. 4 Keyed upon the propeller shaft, within the ring 5, is a clutch disk 6 having right angular recesses or chambers 7 in its periphery at spaced points around the same, as shown clearly in Fig. 6, and disposed within these recesses are balls 8 which are held within the recesses by a rim or flange 9 on a disk 10 which is mounted loosely upon the propeller shaft at the rear of the clutch disk. The external periphery of the collar or disk 10 has an annular shoulder formed thereon, as shown at 11, and against this shoulder seats a washer or other annular keeper 12 which is secured upon the rear side of the ring 5, as will be understood upon reference to Figs. 2, 3 and 4. The keeper or washer 12 holds the collar 10 close to the clutch disk 6 so that the balls 8 are confined within the triangular chambers formed by the recesses 7 and the inner periphery of the rim 9, as clearly shown in Fig. 6. As long as the car is traveling forwardly, the clutch disk 6 rotates in the direction indicated by the arrow $a$ in Fig. 6 so that the several balls 8 will tend to roll toward the wide ends of the respective triangular chambers 7 and the disk will be free of the rim 9 and may rotate. Should the direction of rotation of the propeller shaft be reversed and the clutch disk rotated in the direction indicated by the arrow $b$ in Fig. 6, the balls 8 will tend to travel toward the apices of the triangular chambers 7 and will therefore bind between the clutch disk and the rim 9 so that if said rim and the collar 10 are free the car may travel backwardly, but if the collar 10 is held stationary, the backward movement of the car will be prevented. The present invention seeks particularly to provide means whereby the collar 10 will be normally held against rotation.

Secured to the rear side of the collar 10 is a brake disk 13 which is provided around its entire periphery with teeth 14, the brake disk being free of the propeller shaft 4 but concentric therewith. Secured upon the rear side of the transmission housing 2, at one side of the ring 5, is a bracket 15 which furnishes a support for a rack bar 16 and for means whereby said rack bar will be operatively connected with a locking bar 17 which is also slidably supported in the bracket. The rack bar 16 is provided with a longitudinal groove 18 in its upper side and this groove receives the lower edge of a guide plate 19 which is secured to the side of a rib or flange 20 formed on the bracket 15, as shown. The rack bar is thus held to a rectilinear path and it may be adjusted to compensate for wear by set bolts 21 which are mounted in the flange or rib 20 and are directed toward the side of the rack bar, balls 22 being preferably disposed between the rack bar and the ends of the set bolts so as to minimize the frictional wear. The rack bar is disposed in alinement with the shift bar 23 which is engaged by the gear shift lever 3 in the usual manner, a roller 24 being provided in the rear end of the shift bar to minimize the frictional wear between said bar and the rack bar. When the shift bar 23 is moved forwardly to set the transmission gearing to drive the car in a forward direction, said bar moves away from the rack bar which will remain in its normal position, but when the shift bar 23 is moved rearwardly so as to set the transmission gearing in reverse, the rack bar will be moved backwardly and will actuate connections whereby the locking bar 17 will be released from the brake disk 13 to permit reverse travel of the car. Adjacent the rack bar 16 a vertical stub shaft 25 is mounted upon the bracket 15 and this stub shaft has fixed thereto a segmental gear 26 which meshes with the rack bar, as clearly shown in Fig. 3. A rearwardly projecting crank or lever 27 is secured to the upper end of the stub shaft 25 and to the rear extremity of this crank or lever is pivoted one end of a link 28 which extends to and is pivoted to the outer end of a crank or lever 29 which is secured to the upper end of a vertical shaft 30 mounted in bearings provided therefor on the side of the bracket 15. Between the bearings for the shaft 30 an eccentric 31 is secured upon the shaft and said eccentric is disposed within and operates upon an eccentric head or strap 32 which is formed on or secured to the outer end of an eccentric rod 33 which is slidably mounted in the bracket 15 and has its inner end turned rearwardly, as shown at 34, to be pivotally connected with the slidable locking bar 17. A roller bearing 35 is interposed between the eccentric and the eccentric head 32 to minimize the frictional wear and provide for the easy operation of the apparatus at all times. The locking bar 17 is slidably mounted in the bracket 15, as shown most clearly in Fig. 4, and at its inner end is provided with an enlarged segment 36 having teeth upon its side adapted to mesh with the teeth 14 of the brake disk 13 so that, when these parts are in engagement, rotation of the brake disk cannot occur. When the eccentric is in the position shown in Fig. 4, the locking bar 17 will be projected into engagement with the brake disk, but if the eccentric be given a half turn, the locking bar will be released from the brake disk and the brake disk may then rotate so that the car may be driven backwardly. It should be particularly noted that the teeth upon the brake disk 13 are of such shape that their lower sides at the working side of the disk taper upwardly while the teeth upon the brake head 36 have their upper sides tapered downwardly whereby, if the parts should tend to stick for any reason when reverse travel is desired, the weight of the car will tend to cause it to roll downhill and the particular shape of the teeth will then force the locking bar out of engagement with the disk so that binding of the parts will not occur.

From the foregoing description, taken in connection with the accompanying drawings, it will be understood that normally the locking bar is in engagement with the brake disk, as shown in Fig. 2, and the rack bar 16 is in its forward position, the eccentric 31 being disposed as shown in Fig. 4 so that it holds the locking bar in engagement with the brake disk. As long as the car is traveling forwardly, the brake disk and the collar 10 and other associated parts will be inoperative and will not interfere with the travel of the car. Should the car stop upon an upgrade and the brakes be not properly or promptly applied, the weight of the car will tend to cause reverse downhill movement thereof but this movement will be at once arrested by the brake disk and the collar 10 attached thereto, as has been heretofore explained. Should the gearing, however, be shifted into reverse, the rack bar 16 will be moved rearwardly so that the segment 26 will be given a partial rotation and this rotation will be transmitted to the shaft 30 and the eccentric 31 whereby the eccentric bar 33 and the locking bar 17 will be slid outwardly to release the brake head 36 from the brake disk and permit the backward travel of the car. A retractile spring 37, anchored at one end upon the link 29 and at its other end upon the transmission housing or upon the bracket 15, will return the parts to the normal position and yieldably resist shifting them out of the normal position so that the chauffeur will be relieved of the necessity of examining the apparatus of my invention in order to determine that it is always in the proper position under given circumstances. He will operate the car in the same manner as he would operate it if my invention was not applied thereto.

My device is very simple and compact and can be applied to any automobile or other vehicle at a slight cost and will operate efficiently to prevent rearward travel of a car upon an upgrade while permitting the travel if such travel be desired.

Having thus described the invention, I claim:

1. An attachment for the driving mechanism of automobiles comprising a brake disk, means whereby said brake disk may be clutched to the propeller shaft of the automobile, means for normally holding said brake disk against rotation, a rack bar actuated by the transmission shift bar of the automobile, a gear meshing with the rack bar, a crank connected with the gear, and operative connections between the crank and brake disk holding means whereby when the automobile is put in reverse gear the brake disk will be released to rotate.

2. An attachment for automobiles comprising a brake disk arranged concentrically with the propeller shaft of an automobile, means whereby the brake disk will be normally held against rotation, a clutch adapted to connect the brake disk with the propeller shaft whereby to normally resist rearward travel of the automobile, a rack bar arranged in alinement with the transmission shift bar of the automobile, a gear meshing with the rack bar, and operative connections between the gear and brake disk holding means whereby when the automobile is driven rearwardly the brake disk will be released and may rotate with the propeller shaft.

3. An attachment for automobiles comprising a brake disk arranged concentrically with the propeller shaft of an automobile, a clutch for connecting the brake disk with the propeller shaft, a brake head normally engaging the brake disk to prevent rotation of the same, yieldable means for holding the brake head in engagement with the brake disk, a rack bar arranged in alinement with the transmission shift bar of the automobile and actuated thereby, a gear meshing with the rack bar, and operative connections between the gear and brake head whereby when the automobile is driven rearwardly the brake head will be released from the brake disk.

4. In apparatus for the purpose set forth, the combination of a brake disk, a clutch adapted to connect the disk with a propeller shaft, a locking bar slidably mounted at one side of the brake disk, a brake head on said bar normally engaging the brake disk, a rack bar arranged in alinement with the transmission shift bar of the automobile and actuated thereby, a segment meshing with the rack bar, yieldable means for holding the brake head in engagement with the brake disk, and operative connections between the segment and locking bar whereby when the automobile is driven rearwardly the brake head will be released from the brake disk.

5. In apparatus for the purpose set forth, the combination of a brake disk, a clutch adapted to connect the brake disk with the propeller shaft of an automobile, a locking bar slidably mounted to move toward and from the edge of the brake disk, a brake head on said bar to engage the brake disk, an eccentric, an eccentric bar actuated by the eccentric and connected with the locking bar, yieldable means acting upon the eccentric to hold the brake head normally in engagement with the brake disk, and means whereby when the automobile is driven rearwardly the eccentric will be shifted to release the brake head from the brake disk.

6. In apparatus for the purpose set forth, the combination of a brake disk, means for connecting the brake disk to the propeller shaft of an automobile, a brake head normally engaging the brake disk, a locking bar carrying the brake head and mounted to slide to and from the brake disk, a shaft disposed at one side of the brake disk, an eccentric on said shaft operatively connected with the locking bar, a crank at the upper end of the shaft, yieldable means connected with the crank to hold the shaft and the eccentric in position to maintain engagement between the brake head and the brake disk, a rack bar arranged in alinement with the shift bar of the transmission mechanism, a segment meshing with the rack bar, and connections between said segment and said crank.

7. An attachment for the driving mechanism of automobiles comprising a toothed brake disk, means whereby said disk may be clutched to the propeller shaft of the automobile, a reciprocating brake bar movable in a plane at substantially right angles to the brake disk and provided with teeth engaging the teeth on the brake disk for normally holding said brake disk against rotation, a brake operating member disposed substantially parallel with the brake disk and in alinement with the transmission sift bar of the automobile and actuated thereby, and means forming an operative connection between the brake operating member and said reciprocating brake bar whereby when the automobile is put into reverse gear the brake disk will be released to rotate.

BENJAMIN F. SINGER. [L. S.]